April 15, 1958 — K. A. MARGGRAF ET AL — 2,831,155
AUTOMATIC PILOT CONTROL SYSTEM
Filed March 13, 1952

INVENTORS.
Kurt A. Marggraf
Werner F. Massmann
By Wallenstein & Spangenberg attys United States Patent Office 2,831,155
Patented Apr. 15, 1958

2,831,155

AUTOMATIC PILOT CONTROL SYSTEM

Kurt A. Marggraf and Werner F. Massmann, Lemont, Ill., assignors to Ampatco Laboratories Corporation, Lemont, Ill., a corporation of Delaware Application March 13, 1952, Serial No. 276,402

13 Claims. (Cl. 318—489)

This invention is directed primarily to an automatic pilot for a craft having control surfaces and a gyro mechanism or the like for controlling the control surfaces to guide the craft in its movement. This invention has particular utility in guiding high speed air craft, guided missiles and the like.

One of the main problems involved in automatic pilot design, particularly for high speed craft, lies in the fact that the system, in order to give satisfactory performance, requires actuators for the control surfaces which are relatively fast in response. The response of conventional automatic pilot systems, consisting of proportionally positioned servomotors and proportional electronic power amplifiers for the servomotors controlled by the gyro mechanisms and feed-back circuits controlled by the servomotors, is limited by the inertia of such motors and the inertia and time constants of such amplifiers.

The principal object of this invention is to provide an improved automatic pilot system having faster response under the same conditions than conventional automatic pilot systems whereby more accurate guiding of high speed craft is made possible, wherein the angular velocities of the control surfaces are controlled rather than the proportional positioning thereof, wherein relatively small high speed motors having minimum inertia are utilized for operating the control surfaces, and wherein simple, direct and nonelectronic mechanisms having minimum inertia and time lag are utilized for controlling the motors in accordance with the dictates of the gyro mechanisms.

Briefly, the automatic pilot system of this invention includes a galvanometer having a magnetic field, a rotor rotatable about an axis transverse to the magnetic field, contact means carried by the rotor and spaced stationary contact means alternately engaged by the rotor contact means as the rotor rotates in one direction or the other. Means controlled by the gyro mechanism apply a turning force to the rotor of the galvanometer in one direction or the other and in varying degree. A high speed reversible electric motor actuates the control surface. Electrical connections extend between the contact means of the galvanometer and the reversible electric motor for actuating the latter in one direction or the other depending upon which stationary contact means are contacted by the rotor contact means. A coil is carried by the rotor of the galvanometer in the magnetic field for applying a turning force to the rotor in opposition to the turning force applied by the gyro mechanism. Means are controlled by the electric motor for energizing that coil in response to the direction and rate of operation of the electric motor for balancing the turning force applied by the gyro mechanism to control intermittently the electric motor and operate the same in a direction and at a mean rate corresponding to the direction and degree of the turning force applied by the gyro mechanism.

This latter means for controlling the energization of the coil in response to the direction and rate of operation of the electric motor may take various forms. In one form a generator driven by the electric motor is electrically connected to the coil. In another form the coil is electrically connected across the electric motor to respond to its back E. M. F. and hence its direction and speed. Here an additional coil in opposition to the first coil may be connected across a resistor in the electric motor circuit to compensate for the voltage drop across the electric motor to provide more accurate response. In still another form the electric motor is connected in one leg or arm of a bridge circuit and the diagonal points of this bridge circuit are connected to the coil for compensating for the voltage drop in the electric motor and for energizing the coil in accordance with the back E. M. F. and hence the direction and speed of the electric motor.

The high speed electric motor is preferably a D. C. motor having a constant field and having its armature winding controlled by the contact means of the galvanometer to obtain fast response. The gyro mechanism may apply its turning force to the rotor of the galvanometer by being electrically connected to a coil carried by the rotor in the magnetic field. The gyro mechanism may be of the rate type or of the position type. In the case of the rate type, the electric motor is operated in a direction and at a speed corresponding to the direction and rate of deviation of the craft. In the case of the positioning type, the electric motor is operated in a direction and at a speed corresponding to the direction and extent of deviation of the craft from a desired course. The system of this invention may also be utilized for controlling other devices in response to other conditions whereby the electric motor would be operated in a direction and at a speed in accordance with the direction and degree of turning force applied to the rotor of the galvanometer by substantially any type of condition responsive device.

Further objects of this invention reside in the details of construction of the control system and in the cooperative relationships between the component parts thereof.

Other objects and advantages of this invention will become apparent to those skilled in the art upon reference to the accompanying specification, claims and drawing, in which:

Figure 1:
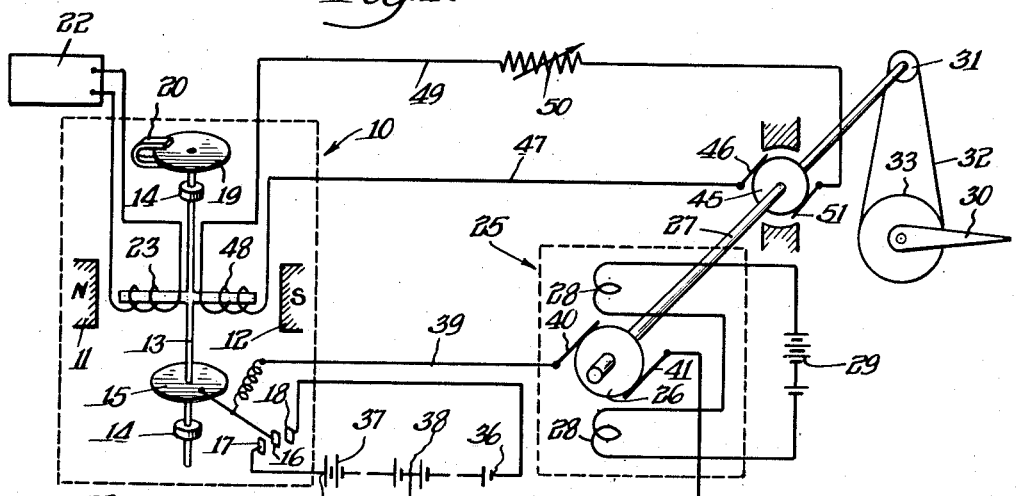
Fig. 1 is a wiring diagram of one form of the control system of this invention.

Referring first to the form of the invention illustrated in Fig. 1, an electromechanical amplifier in the form of a galvanometer is generally designated at 10. The galvanometer includes a magnet having poles 11 and 12 for establishing a magnetic field. A rotor 13 is rotatably mounted by bearings 14 so as to be rotatable about an axis transverse to the magnetic field produced by the magnet. The rotor 13 carries a plate or similar device 15 which in turn carries a contact 16 which is adapted alternately to engage one or the other of a pair of spaced stationary contacts 17 and 18, depending upon the direction of rotation of the rotor 13. For the purpose of damping unwanted oscillations of the rotor 13 it may be provided with a disc 19 operating within a magnet 20 which places a drag upon the disc 19 and, hence, upon the rotor 13. Preferably, the rotor 13 is not biased to any particular position but is free to rotate between the positions determined by the stationary contacts 17 and 18.

A turning force in one direction or another and in varying degree is applied to the rotor 13 of the galvanometer by means of a condition responsive means 22. Here the condition responsive means 22 may be a gyro mechanism of the rate type or the positioning type which produces a voltage across its terminals of one polarity or opposite polarity and of varying value. For example, in the event that the gyro mechanism 22 is of the rate type, it produces a voltage of one polarity or opposite polarity and of a value depending upon the direction and rate of deviation of the craft. In the case of a positioning type gyro, the polarity and value of the voltage produced thereby would correspond to the direction and extent of deviation of the craft from a predetermined course. The terminals of the gyro mechanism 22 are connected to a coil 23 carried by the rotor 13 in the magnetic path produced by the magnet. This coil cooperates with the magnetic path to apply a turning force to the rotor 13 in one direction or the other and in varying degree depending upon the polarity and value of the voltage applied by the condition responsive device 22 to the coil 23. This turning force causes the rotor contact 16 to engage either of the stationary contacts 17 or 18, depending upon the direction of the turning force so applied to the rotor 13.

The control system also includes an electric motor generally designated at 25. Preferably this motor is a D. C. motor having an armature 26 provided with suitable armature windings and carried by a motor shaft 27. The armature 26 is located in a field produced by field windings 28 which are connected to and permanently energized by a D. C. voltage source 29. The electric motor 25 in the case of an automatic pilot system may operate a control surface 30 utilized for guiding the craft. The control surface 30 may be operated through a speed reducer, shown diagrammatically in Fig. 1, to include sprocket wheels 31 and 33 connected by a chain 32. Of course, any type of speed reducer having desired speed reduction characteristics may be utilized.

The stationary contact 17 of the galvanometer is connected to one terminal 35 and the other stationary contact 18 is connected to another terminal 36 of a D. C. voltage source 37 having an intermediate terminal 38. For example, the terminal 35 may be positive with respect to terminal 38 and terminal 36 may be equally negative with respect to terminal 38. The rotor contact 16 is connected by a conductor 39 to one of the brushes 40 cooperating with the armature winding of the motor. The other brush 41 is conected by a conductor 42 to the central terminal 38 of the D. C. voltage source. Thus, when the rotor contact 16 engages the stationary contact 17 a voltage of one polarity is applied to the armature winding of the motor to drive the motor in one direction and when the rotor contact 16 engages the stationary contact 18 a voltage of opposite polarity is applied to the armature winding of the motor to drive the motor in the opposite direction. In this way the electric motor 25 is driven in one direction or the opposite direction depending upon the turning force applied to the galvanometer and the voltage so applied to the armature winding is of maximum value to produce maximum torque for driving the motor at maximum speed in the proper direction.

The motor shaft 27 drives a generator 45 for producing a voltage of one polarity or opposite polarity depending upon the direction of rotation of the motor and with a voltage corresponding to the speed of operation of the motor. One of the brushes 46 of the generator 45 is connected by a conductor 47 to a coil 48 also carried by the rotor 13 in the magnetic field produced by the magnet. This coil 48 is in turn connected through a conductor 49 and a variable resistor 50 to the other brush 51 of the generator 45. The coil 48 controlled by the generator operates in opposition to the coil 23 controlled by the condition responsive device 22. In other words, the coil 48 produces a turning force opposed to the turning force produced by the coil 23. The two coils located in the magnetic field when energized apply turning forces to the rotor 13 proportionally respectively to their ampere turns. The turning force applied by the generator 45, in accordance with the speed of the motor 25, may be regulated by adjusting the resistor 50.

When a signal voltage is produced acoss the coil 23 the rotor 13 is turned to cause the rotor contact 16 to engage with one or the other of the contacts 17 or 18 and the turning force so applied is proportional to the value of the signal voltage. For example, assume that the signal voltage is of a polarity to cause the rotor contact 16 to engage the stationary contact 17. As a result, a circuit is completed through the armature winding of the motor 25 to drive the same in one direction, this being accomplished with the greatest possible acceleration since the full voltage of the voltage source 37 is effective. The motor so operating drives the generator to produce a voltage across the other coil 48 to provide a turning force in opposition to the turning force applied by the coil 23. At a certain speed of the motor the current through the coil 48 counteracts magnetically the current through the coil 23 and will make the total number of ampere turns change sign, thereby bringing the rotor contact 16 into engagement with the other stationary contact 18. This reverses the voltage across the armature of the motor 25 forcefully to decelerate the motor. When the motor has decelerated to a predetermined value, the rotor contact 16 returns to the contact 17, again to accelerate the motor. Thus the motor is intermittently operated by the rotor contact 16 alternately engaging the stationary contacts 17 and 18 to drive the same at a rate corresponding to the direction and degree of the turning force applied to the rotor 13 of the galvanometer by the signal voltage on the coil 23. In other words, the angular velocity or speed of the motor and, hence, that of the control surface 30 oscillates slightly about a mean value which is proportional to the signal voltage applied to the coil 23. This amplitude of the oscillation is so small as to be substantially negligible, since the moment of inertia of the rotor 13 and the parts secured thereto is very small compared with that of the armature of the electric motor 25. If the damping in the system is high enough the oscillation may be made to vanish entirely. To provide additional damping to the rotor 13, if so desired, the eddy current dampener, consisting of the disc 19 and magnet 20, may be utilized. The ratio between the input signal to the coil 23 and the resulting steady state angular velocity or speed of the electric motor and, hence, the control surface may be adjusted to the desired value by adjusting the resistor 50.

In the case of a rate type gyro mechanism, the electric motor 25 and the control surface 30 are adjusted in a direction and at a rate corresponding to the direction and rate of deviation of the craft. In the case of a positioning type gyro mechanism the electric motor 25 and hence the control surface 30 are adjusted in a direction and at a rate corresponding to the direction and extent of deviation of the craft from a predetermined course.

Figure 2:
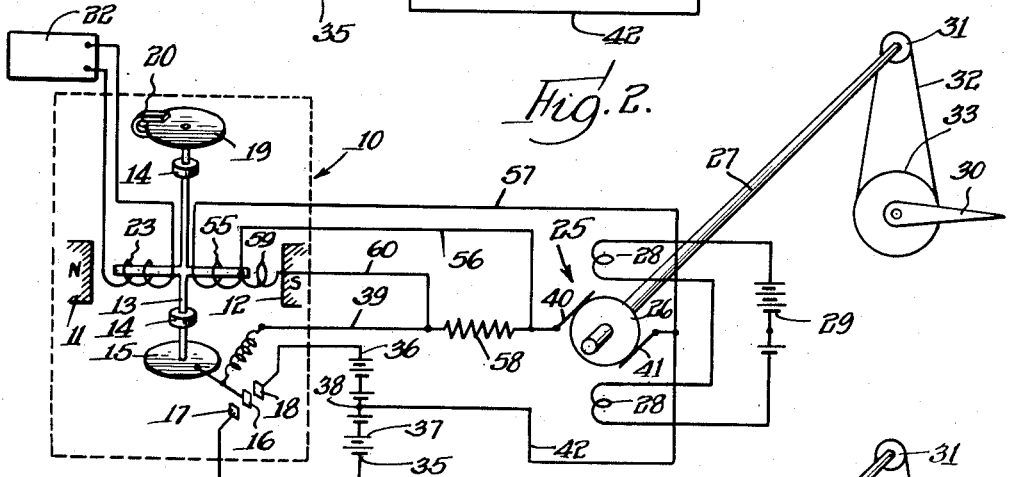
Fig. 2 is a view similar to Fig. 1 but illustrating another form of the control system of this invention.

The form of the invention illustrated in Fig. 2 is very much like that illustrated in Fig. 1 and like reference characters have been utilized for like parts. However, the generator is eliminated in the Fig. 2 form and instead the counteracting or balancing turning force applied to the rotor of the galvanometer is controlled by the back E. M. F. of the motor, which in turn corresponds to the speed of the motor. Here a coil 55 carried by the rotor 13 in the magnetic field of the galvanometer for opposing the coil 23 is connected by conductors 56 and 57 across the armature winding of the electric motor 25. Thus as the motor operates in one direction or the other the back E. M. F. so produced by the motor energizes the coil 55 to balance the galvanometer. To compensate for the voltage drop caused by the resistance of the armature, a resistor 58 is connected in series with the armature winding and an additional coil 59 is carried by the rotor 13 in the magnetic path of the galvanometer. This coil 59 acts in opposition to the coil 55 and is connected by conductors 56 and 60 across the resistor 58. The resistor 58 is so selected or adjusted that the total number of ampere turns of coils 55 and 59 is zero when a current flows through the resistor and the armature while the armature is stationary. With this adjustment or selection of the resistor 58 the total number of ampere turns of the coils 55 and 59 is proportional to the counter E. M. F. of the motor and, consequently, also proportional to the motor speed, the resistance of the armature winding being completely compensated.

This form of the invention illustrated in Fig. 2, including the coils 55 and 59 and the resistor 58, has in principle the same general effect as the coil 48 and generator 45 of the form of the invention illustrated in Fig. 1 and the manners of operation of the two forms of the invention are substantially the same. The Fig. 2 form, however, has certain definite advantages over the Fig. 1 form in that it is more accurate and has greater simplicity.

Figure 3:
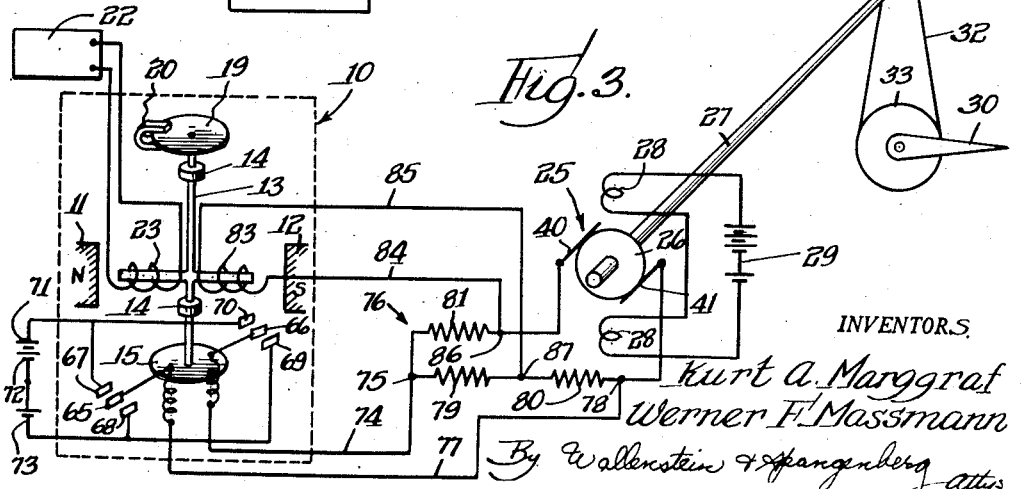
Fig. 3 is also a view similar to Fig. 1 but illustrating still another form of the control system of this invention.

The form of the invention illustrated in Fig. 3 is also very much like those illustrated in Figs. 1 and 2 and like reference characters have been utilized for like parts. The general manner of operation is also very similar. In Fig. 3 the disc 15 carried by the rotor 13 carries two contacts 65 and 66, the rotor contact 65 alternately engaging stationary contacts 67 and 68 and the rotor contact 66 alternately engaging stationary contacts 69 and 70. When the rotor is operated in one direction the rotor contacts 65 and 66 engage the stationary contacts 67 and 69 and when rotated in the opposite direction the rotor contacts 65 and 66 engage the stationary contacts 68 and 70.

The contacts 67 and 70 are connected together and to one terminal 71 of a D. C. voltage source. The other stationary contacts 68 and 69 are connected together and to the other terminal 73 of the voltage source 72. Thus, when the rotor 13 is moved in one direction or the other a voltage of one polarity or of opposite polarity is produced across the conductors 74 and 77 connected to the rotor contacts 65 and 66. The conductors 74 and 77 are connected to points 75 and 78 of a bridge circuit 76. The bridge circuit 76 includes resistors 79 and 80 in two of its legs and a resistor 81 in another of its legs. The armature winding of the motor 25 is included in the fourth leg of the bridge circuit. This form of the invention also includes a coil 83 carried by the rotor 13 in the magnetic field of the galvanometer which is connected by conductors 84 and 85 to diagonal points 86 and 87 of the bridge circuit. This coil 83 operates in opposition to the coil 23 to perform a balancing action. When the bridge circuit 76 is balanced, as by the proper selection or adjustment of the resistors thereof, the resistance of the armature winding is completely compensated for and the current through the coil 83 in the armature is proportional to the counter E. M. F. of the armature winding produced by rotation of the motor. Thus the bridge circuit 76, including the armature winding of the motor 25, operates in conjunction with the coil 83 of the galvanometer to serve the same purpose as the pair of coils 55 and 59 and the resistor 58 of the Fig. 2 form of the invention. The Fig. 3 form of the invention is just as accurate as the Fig. 2 form and it is somewhat simpler in that it utilizes only a single counterbalancing coil in the galvanometer.

In all three forms of the invention the same general operation is provided, namely, that the direction and speed of the operation of the motor and, hence, of the control surface corresponds to the direction and value of the signal voltage applied to the galvanometer by the gyro or other mechanism. In all instances the electric motor is intermittently energized in one direction or the other by the galvanometer to provide a mean speed corresponding to the value of the signal voltage. In all instances maximum voltage is applied to the electric motor to provide maximum torque and acceleration and deceleration. In all of the systems the response to changes in the control signal is extremely rapid and the inertia and time lag of the system are maintained at a minimum. The three systems differ in specific details as to the manner of applying the counteracting turning force to the rotor of the galvanometer and, in this respect, some of the systems have definite advantages over the others as to accuracy and simplicity. While the control systems of this invention have been described in connection with automatic pilot systems for guiding craft, and they have particular utility toward this end by reason of their rapid response and low inertia, they may be incorporated in many other types of control systems and made responsive to various other types of conditions.

While for purposes of illustration three forms of this invention have been disclosed, other forms thereof may become apparent to those skilled in the art upon reference to these disclosures and, therefore, this invention is to be limited only by the scope of the appended claims.

We claim:

1. In an automatic pilot for a craft having a control surface and a gyro mechanism for controlling said control surface, the combination of, a galvanometer having a magnetic field, a rotor rotatable about an axis transverse to the magnetic field, contact means carried by the rotor and spaced stationary contact means alternately engaged by the rotor contact means as the rotor rotates in one direction or the other, means controlled by the gyro mechanism for applying a turning force to the rotor of the galvanometer in one direction or the other and in varying degree, a reversible electric motor for actuating the control surface, electrical connections between said contact means and said reversible electric motor for actuating said electric motor in one direction or the other depending upon which stationary contact means are contacted by the rotor contact means, a coil carried by the rotor of the galvanometer in the magnetic field for applying a turning force to the rotor in opposition to the turning force applied by the gyro mechanism, and means controlled by the electric motor for energizing said coil in response solely to the direction and rate of operation of the electric motor for balancing the turning force applied by the gyro mechanism to control intermittently the electric motor and operate the same in a direction and at a mean rate corresponding to the direction and degree of the turning force applied by the gyro mechanism.

2. In an automatic pilot for a craft having a control surface and a gyro mechanism for controlling said control surface, the combination of, a galvanometer having a magnetic field, a rotor rotatable about an axis transverse to the magnetic field, coil means carried by the rotor in the magnetic field, contact means carried by the rotor and spaced stationary contact means alternately engaged by the rotor contact means as the rotor rotates in one direction or the other, means controlled by the gyro mechanism for energizing the coil means and hence applying a turning force to the rotor of the galvanometer in one direction or the other and in varying degree, a reversible electric motor for actuating the control surface, electrical connections between said contact means and said reversible electric motor for actuating said electric motor in one direction or the other depending upon which stationary contact means are contacted by the rotor contact means, and means controlled by the motor for energizing the coil means and applying a turning force to the rotor of the galvanometer in the opposite direction in response solely to the direction and rate of operation of the electric motor for balancing the turning force applied by the gyro mechanism to control intermittently the electric motor and operate the same in a direction and at a mean rate corresponding to the direction and degree of the turning force applied by the gyro mechanism.

3. In an automatic pilot for a craft having a control surface and a gyro mechanism for controlling said control surface, the combination of, a galvanometer having a magnetic path, a rotor rotatable about an axis transverse to the magnetic field, first and second coils carried by the rotor in the magnetic field, contact means carried by the rotor and spaced stationary contact means alternately engaged by the rotor contact means as the rotor rotates in one direcion or the other, means controlled by the gyro mechanism for energizing the first coil and hence applying a turning force to the rotor of the galvanometer in one direction or the other and in varying degree, a reversible electric motor for actuating the control surface, electrical connections between said contact means and said reversible electric motor for actuating said electric motor in one direction or the other depending upon which stationary contact means are contacted by the rotor contact means, and means controlled by the motor for energizing the second coil and hence applying a turning force to the rotor of the galvanometer in response solely to the direction and rate of operation of the electric motor for balancing the turning force applied by the gyro mechanism to control intermittently the electric motor and operate the same in a direction and at a mean rate corresponding to the direction and degree of the turning force applied by the gyro mechanism.

4. In an automatic pilot for a craft having a control surface and a gyro mechanism for controlling said control surface, the combination of, a galvanometer having a magnetic field, a rotor rotatable about an axis transverse to the magnetic field, contact means carried by the rotor and spaced stationary contact means alternately engaged by the rotor contact means as the rotor rotates in one direction or the other, means controlled by the gyro mechanism for applying a turning force to the rotor of the galvanometer in one direction or the other and in varying degree, a reversible electric motor for actuating the control surface, electrical connections between said contact means and said reversible electric motor for actuating said electric motor in one direction or the other depending upon which stationary contact means are contacted by the rotor contact means, a coil carried by the rotor of the galvanometer in the magnetic field for applying a turning force to the rotor in opposition to the turning force applied by the gyro mechanism, an electric generator driven by the electric motor, and electrical connections between the electric generator and the coil for energizing said coil in response solely to the direction and rate of operation of the electric motor for balancing the turning force applied by the gyro mechanism to control intermittently the electric motor and operate the same in a direction and at a mean rate corresponding to the direction and degree of the turning force applied by the gyro mechanism.

5. In an automatic pilot for a craft having a control surface and a gyro mechanism for controlling said control surface, the combination of, a galvanometer having a magnetic field, a rotor rotatable about an axis transverse to the magnetic field, contact means carried by the rotor and spaced stationary contact means alternately engaged by the rotor contact means as the rotor rotates in one direction or the other, means controlled by the gyro mechanism for applying a turning force to the rotor of the galvanometer in one direction or the other and in varying degree, a reversible electric motor for actuating the control surface, electrical connections between said contact means and said reversible electric motor for actuating said electric motor in one direction or the other depending upon which stationary contact means are contacted by the rotor contact means, a pair of coils carried by the rotor of the galvanometer in the magnetic field for applying a turning force to the rotor in opposition to the turning force applied by the gyro mechanism, a resistor in the electrical connections between the contact means and the electric motor, and means for connecting one of the coils in parallel with the electric motor and the other coil in parallel with the resistor for compensating for the voltage drop across the electric motor and for energizing the pair of coils in response solely to the direction and amount of back E. M. F. of the electric motor and hence the direction and rate of operation of the electric motor for balancing the turning force applied by the gyro mechanism to control intermittently the electric motor and operate the same in a direction and at a mean rate corresponding to the direction and degree of the turning force applied by the gyro mechanism.

6. In an automatic pilot for a craft having a control surface and a gyro mechanism for controlling said control surface, the combination of, a galvanometer having a magnetic field, a rotor rotatable about an axis transverse to the magnetic field, contact means carried by the rotor and spaced stationary contact means alternately engaged by the rotor contact means as the rotor rotates in one direction or the other, means controlled by the gyro mechanism for applying a turning force to the rotor of the galvanometer in one direction or the other and in varying degree, a reversible electric motor for actuating the control surface, electrical connections between said contact means and said reversible electric motor for actuating said electric motor in one direction or the other depending upon which stationary contact means are contacted by the rotor contact means, a coil carried by the rotor of the galvanometer in the magnetic field for applying a turning force to the rotor in opposition to the turning force applied by the gyro mechanism, and means for connecting the coil to the electrical connections between the contact means and the electric motor for energizing the coil in response solely to the direction and amount of back E. M. F. of the electric motor and hence the direction and rate of operation of the electric motor for balancing the turning force applied by the gyro mechanism to control intermittently the electric motor and operate the same in a direction and at a mean rate corresponding to the direction and degree of the turning force applied by the gyro mechanism.

7. In an automatic pilot for a craft having a control surface and a gyro mechanism for controlling said control surface, the combination of, a galvanometer having a magnetic field, a rotor rotatable about an axis transverse to the magnetic field, contact means carried by the rotor and spaced stationary contact means alternately engaged by the rotor contact means as the rotor rotates in one direction or the other, means controlled by the gyro mechanism for applying a turning force to the rotor of the galvanometer in one direction or the other and in varying degree, a reversible electric motor for actuating the control surface, electrical connections between said contact means and said reversible electric motor for actuating said electric motor in one direction or the other depending upon which stationary contact means are contacted by the rotor contact means, a coil carried by the rotor of the galvanometer in the magnetic field for applying a turning force to the rotor in opposition to the turning force applied by the gyro mechanism, a bridge circuit included in said electrical connections with the electric motor included within one arm of the bridge circuit, and means for connecting the coil to the diagonal points of said bridge circuit for compensating for the voltage drop across the electric motor and for energizing the coil in response solely to the direction and amount of back E. M. F. of the electric motor and hence the direction and rate of operation of the electric motor for balancing the turning force applied by the gyro mechanism to control intermittently the electric motor and operate the same in a direction and at a mean rate corresponding to the direction and degree of the turning force applied by the gyro mechanism.

8. In a control system for regulating a control condition and responsive to the deviation of the control condition from a predetermined value, the combination of, a galvanometer having a magnetic field, a rotor rotatable about an axis transverse to the magnetic field, contact means carried by the rotor and spaced contact means alternately engaged by the rotor contact means as the rotor rotates in one direction or the other, means responsive to the control condition for applying a turning force to the rotor of the galvanometer in one direction or the other and in varying degree in accordance with the deviation of the control condition from the predetermined value, regulating means for the control condition, a reversible D. C. electric motor operating the regulating means and having a permanently energized field winding and an armature winding, electrical connections between a source of D. C. voltage, the contact means and the armature winding for actuating the electric motor in one direction or the other depending upon which stationary contact means are contacted by the rotor contact means, a coil carried by the rotor of the galvanometer in the magnetic field for applying a turning force to the rotor in oposition to the turning force applied by the control condition responsive means, and means electrically connected to the coil and controlled by the electric motor for energizing said coil in response solely to the direction and rate of operation of the electric motor for balancing the turning force applied by the control condition responsibe means to control intermittently the electric motor and operate the same in a direction and at a mean rate corresponding to the direction and degree of deviation of the control condition from the predetermined value.

9. In a control system for regulating a control condition and responsive to the deviation of the control condition from a predetermined value, the combination of, a galvanometer having a magnetic field, a rotor rotatable about an axis transverse to the magnetic field, contact means carried by the rotor and spaced contact means alternately engaged by the rotor contact means as the rotor rotates in one direction or the other, means responsive to the control condition for applying a turning force to the rotor of the galvanometer in one direction or the other and in varying degree in accordance with the deviation of the control condition from the predetermined value, regulating means for the control condition, a reversible D. C. electric motor operating the regulating means and having a permanently energized field winding and an armature winding, electrical connections between a source of D. C. voltage, the contact means and the armature winding for actuating the electric motor in one direction or the other depending upon which stationary contact means are contacted by the rotor contact means, a coil carried by the rotor of the galvanometer in the magnetic field for applying a turning force to the rotor in opposition to the turning force applied by the control condition responsive means, an electric generator driven by the electric motor, and electric connections between the electric generator and the coil for energizing said coil in response solely to the direction and rate of operation of the electric motor for balancing the turning force applied by the control condition responsive means to control intermittently the electric motor and operate the same in a direction and at a mean rate corresponding to the direction and degree of deviation of the control condition from the predetermined value.

10. In a control system for regulating a control condition and responsive to the deviation of the control condition from a predetermined value, the combination of, a galvanometer having a magnetic field, a rotor rotatable about an axis transverse to the magnetic field, contact means carried by the rotor and spaced contact means alternately engaged by the rotor contact means as the rotor rotates in one direction or the other, means responsive to the control condition for applying a turning force to the rotor of the galvanometer in one direction or the other and in varying degree in accordance with the deviation of the control condition from the predetermined value, regulating means for the control condition, a reversible D. C. electric motor operating the regulating means and having a permanently energized field winding and an armature winding, electrical connections between a source of D. C. voltage, the contact means and the armature winding for actuating the electric motor in one direction or the other depending upon which stationary contact means are contacted by the rotor contact means, a coil carried by the rotor of the galvanometer in the magnetic field for applying a turning force to the rotor in opposition to the turning force applied by the control condition responsive means, and means for connecting the coil to the electrical connections to the armature winding of the electric motor for energizing the coil in response solely to the direction and amount of back E. M. F. of the armature and hence the direction and rate of operation of the electric motor for balancing the turning force applied by the control condition responsive means to control intermittently the electric motor and operate the same in a direction and at a mean rate corresponding to the direction and degree of deviation of the control condition from the predetermined value.

11. In a control system for regulating a control condition and responsive to the deviation of the control condition from a predetermined value, the combination of, a galvanometer having a magnetic field, a rotor rotatable about an axis transverse to the magnetic field, contact means carried by the rotor and spaced contact means alternately engaged by the rotor contact means as the rotor rotates in one direction or the other, means responsive to the control condition for applying a turning force to the rotor of the galvanometer in one direction or the other and in varying degree in accordance with the deviation of the control condition from the predetermined value, regulating means for the control condition, a reversible D. C. electric motor operating the regulating means and having a permanently energized field winding and an armature winding, electrical connections between a source of D. C. voltage, the contact means and the armature winding for actuating the electric motor in one direction or the other depending upon which stationary contact means are contacted by the rotor contact means, a coil carried by the rotor of the galvanometer in the magnetic field for applying a turning force to the rotor in opposition to the turning force applied by the control condition responsive means, and electrical connections for connecting the coil in parallel with the armature winding of the electric motor for energizing the coil in response solely to the direction and amount of back E. M. F. of the armature and hence the direction and rate of operation of the electric motor for balancing the turning force applied by the control condition responsive means to control intermittently the electric motor and operate the same in a direction and at a mean rate corresponding to the direction and degree of deviation of the control condition from the predetermined value.

12. In a control system for regulating a control condition and responsive to the deviation of the control condition from a predetermined value, the combination of, a galvanometer having a magnetic field, a rotor rotatable about an axis transverse to the magnetic field, contact means carried by the rotor and spaced contact means alternately engaged by the rotor contact means as the rotor rotates in one direction or the other, means responsive to the control condition for applying a turning force to the rotor of the galvanometer in one direction or the other and in varying degree in accordance with the deviation of the control condition from the predetermined value, regulating means for the control condition, a reversible D. C. electric motor operating the regulating means and having a permanently energized field winding and an armature winding, electrical connections between a source of D. C. voltage, the contact means and the armature winding for actuating the electric motor in one direction or the other depending upon which stationary contact means are contacted by the rotor contact means, a coil carried by the rotor of the galvanometer in the magnetic field for applying a turning force to the rotor in opposition to the turning force applied by the control condition responsive means, electrical connections for connecting the coil in parallel with the armature winding of the electric motor for energizing the coil in response solely to the direction and amount of back E. M. F. of the armature and hence the direction and rate of operation of the electric motor for balancing the turning force applied by the control condition responsive means to control intermittently the electric motor and operate the same in a direction and at a means rate corresponding to the direction and degree of deviation of the control condition from the predetermined value, a second coil carried by the rotor of the galvanometer in the magnetic field for applying a turning force to the galvanometer in opposition to the turning force applied by the first coil, a resistor in series with the armature winding of the electric motor, and electrical connections for connecting the second coil in parallel with the resistor for compensating for the voltage drop across the armature winding of the electric motor.

13. In a control system for regulating a control condition and responsive to the deviation of the control condition from a predetermined value, the combination of, a galvanometer having a magnetic field, a rotor rotatable about an axis transverse to the magnetic field, contact means carried by the rotor and spaced contact means alternately engaged by the rotor contact means as the rotor rotates in one direction or the other, means responsive to the control condition for applying a turning force to the rotor of the galvanometer in one direction or the other and in varying degree in accordance with the deviation of the control condition from the predetermined value, regulating means for the control condition, a reversible D. C. electric motor operating the regulating means and having a permanently energized field winding and an armature winding, a bridge circuit including the armature winding of the electric motor in one leg of the bridge circuit, electrical connections between a source of D. C. voltage, the contact means and the energizing points of the bridge circuit for energizing the armature winding in one direction or the other and hence actuating the electric motor in one direction or the other depending upon which stationary contact means are contacted by the rotor contact means, a coil carried by the rotor of the galvanometer in the magnetic field for applying a turning force to the rotor in opposition to the turning force applied by the control condition responsive means, and electrical connections for connecting the coil to the diagonal points of the bridge circuit for compensating for the voltage drop across the armature winding of the electric motor and for energizing the coil solely in accordance with the direction and amount of back E. M. F. of the armature and hence the direction and rate of operation of the electric motor for balancing the turning force applied by the control condition responsive means to control intermittently the electric motor and operate the same in a direction and at a mean rate corresponding to the direction and degree of deviation of the control condition from the predetermined value.

References Cited in the file of this patent

UNITED STATES PATENTS

| | | |
|---|---|---|
| 1,871,469 | Rhea | Aug. 16, 1932 |
| 1,966,170 | Greene | July 10, 1934 |
| 1,996,055 | Boykow | Apr. 2, 1935 |
| 2,117,894 | Lenehan | May 17, 1938 |
| 2,163,632 | Satterlee | June 27, 1939 |
| 2,217,254 | Langasser | Oct. 8, 1940 |
| 2,256,875 | Wade | Sept. 23, 1941 |
| 2,364,474 | Rich | Dec. 5, 1944 |
| 2,383,942 | Patin | Sept. 4, 1945 |
| 2,591,938 | Holliday | Apr. 8, 1952 |
| 2,595,868 | Milsom | May 6, 1952 |